United States Patent
Banks

(10) Patent No.: US 11,143,308 B2
(45) Date of Patent: Oct. 12, 2021

(54) BEARING PROTECTOR

(71) Applicant: Joshua William Banks, Rotherham (GB)

(72) Inventor: Joshua William Banks, Rotherham (GB)

(73) Assignee: AES Engineering Ltd., Rotherham (GB)

( * ) Notice: Subject to any disclaimer, the term of this patent is extended or adjusted under 35 U.S.C. 154(b) by 349 days.

(21) Appl. No.: 16/120,716

(22) Filed: Sep. 4, 2018

(65) Prior Publication Data

US 2019/0072184 A1 Mar. 7, 2019

(30) Foreign Application Priority Data

Sep. 4, 2017 (GB) ..................................... 1714111

(51) Int. Cl.
*F16J 15/34* (2006.01)
*F16J 15/447* (2006.01)
*F16C 33/78* (2006.01)
*F16J 15/3252* (2016.01)

(52) U.S. Cl.
CPC ....... *F16J 15/3444* (2013.01); *F16C 33/7886* (2013.01); *F16J 15/3252* (2013.01); *F16J 15/447* (2013.01); *F16C 2300/40* (2013.01)

(58) Field of Classification Search
CPC .... F16J 15/344; F16J 15/3447; F16J 15/3444; F16J 15/3252; F16J 15/447; F16C 33/7886; F16C 2300/40
See application file for complete search history.

(56) References Cited

U.S. PATENT DOCUMENTS

| 5,730,447 | A | * | 3/1998 | Dawson | F16J 15/3444 277/378 |
| 6,805,358 | B2 | * | 10/2004 | Dawson | F16J 15/3444 277/347 |
| 2004/0227299 | A1 | * | 11/2004 | Simmons | F16J 15/3444 277/410 |
| 2006/0006602 | A1 | * | 1/2006 | Roddis | F16J 15/3444 277/378 |
| 2008/0050261 | A1 | * | 2/2008 | Roddis | F16J 15/3444 418/104 |

FOREIGN PATENT DOCUMENTS

| CA | 2961327 A1 | * | 9/2017 | .......... F16J 15/3444 |
| FR | 2514455 A1 | * | 4/1983 | .......... F16J 15/3444 |
| GB | 788385 A | * | 1/1958 | .......... F16J 15/3444 |
| WO | WO-0227221 A2 | * | 4/2002 | .......... F16J 15/3444 |

* cited by examiner

*Primary Examiner* — Vishal A Patel
(74) *Attorney, Agent, or Firm* — Edwin D. Schindler

(57) ABSTRACT

A bearing protector includes a static component fixed relative to a housing, in which a stationary sealing face profile is retained and a rotational component for fixing relative to a shaft with the static and rotational components held axially relative to each other. The rotational component has an annular sealing face profile energized by way of one or more magnetic elements retained within the static component to generate a positive sealing face contact between the stationary sealing face and rotational sealing face profiles. The magnets elements are held within recesses in the static component and extend radially inwards of the recesses.

6 Claims, 3 Drawing Sheets

BEARING PROTECTOR

BACKGROUND OF THE INVENTION

Technical Field of the Invention

The present invention relates, generally, to bearing protectors and their use in rotating equipment and, more particularly, but not exclusively, of the contacting seal face-type. Such devices are used on said rotating equipment for preventing the ingress or egress of a fluid or solid.

Description of the Prior Art

Bearing protectors are used on rotating equipment to prevent fluids, solids and/or debris from entering a bearing chamber. Similarly, bearing protectors are employed to prevent egress of fluids or solids from a bearing chamber. Essentially, their purpose is to prevent the premature failure of bearings by maintaining optimum conditions.

Bearing protectors generally fall into two categories: non-contacting labyrinth bearing protectors and contacting seal face bearing protectors. The present invention relates to the contacting seal face category of bearing protection. More specifically, the present invention relates to contacting seal face bearing protectors whereby the seal faces are energized using magnet force.

SUMMARY OF THE INVENTION

The present invention is directed to an apparatus comprising a static component fixed relative to a housing, wherein a stationary sealing face profile is retained and a rotational component fixed relative to a shaft with the static and rotational components held axially relative to each other and, wherein, the rotational component embodies an annular sealing face profile energized by magnetic elements retained within the static component for generating a positive sealing face contact between the stationary sealing face and rotational sealing face profiles.

The magnetic elements are retained within the static housing component by way of functionally formed holes, thereby allowing the magnetic elements to interact with the rotational component generating positive seal face loading. The magnetic elements are annularly positioned within the housing component creating an attractive force upon the rotary component promoting axial movement and the rotary sealing face to engage the stationary sealing face; the magnetic elements being retained within the static housing component by way of, but not limited to, retaining ports. The rotary component featuring the rotational sealing face profile would be formed in a material that is magnetic to promote attraction to the magnetic elements and incorporate a profile intended to provide a surface for the magnetic elements to attract.

The rotational component profile is such that magnetic element interaction is promoted and a magnetic force gap is set to maintain a predetermined seal face loading. Magnetic attraction is created through a flanged profile of the rotary component which provides a surface for the magnetic elements to attract and whereby said surface is distally positioned to create said predetermined seal face loading.

The present invention may extend to a bearing protection device for use in controlling fluid flow, wherein the device comprises a static housing component fixed relative to the equipment housing and a rotational component fixed relative to the equipment shaft, the static component and rotational components held axially relative to each other via the equipment housing and the equipment shaft, the static housing component comprising at least one feature to slow the fluid therethrough. The flow path may comprise of bends, corners, protrusions, baffles and/or other elements.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

Figure 1:
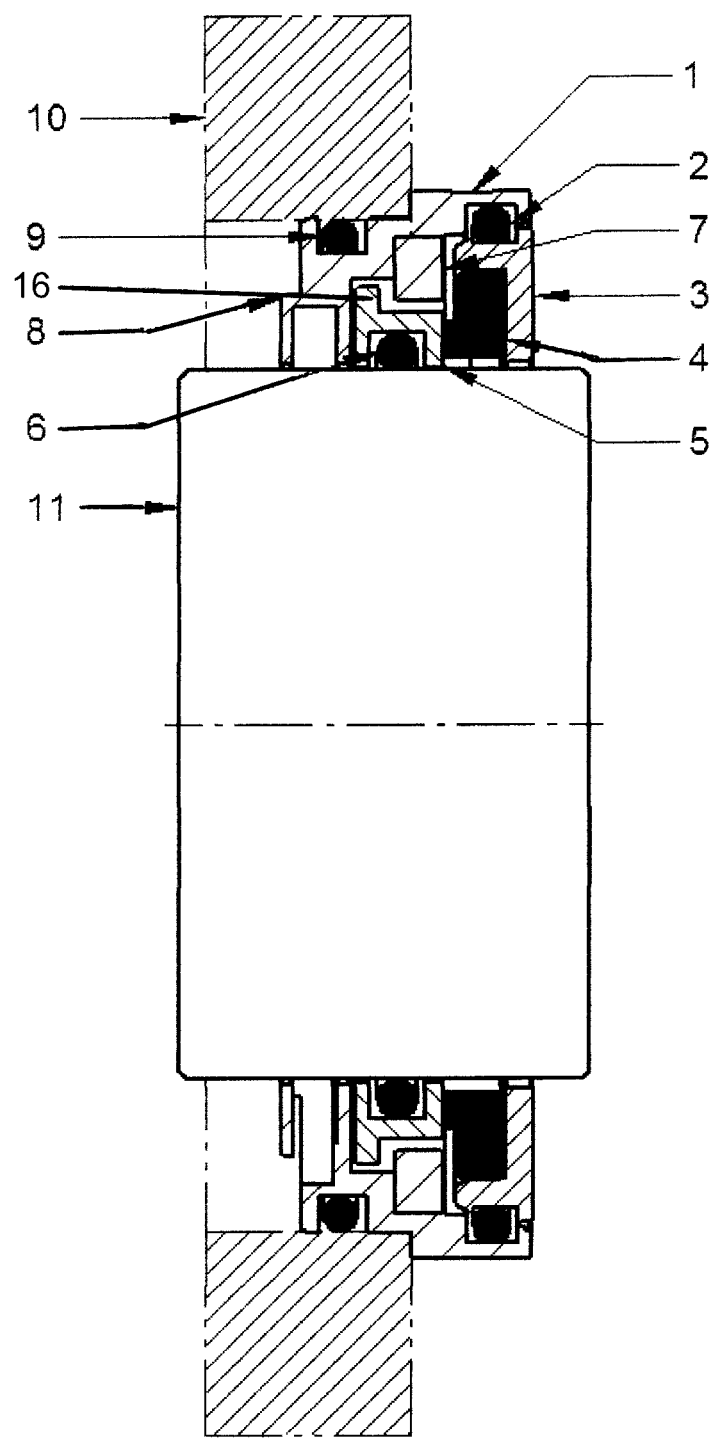
FIG. 1 is a cross-sectional view of a first preferred embodiment of a bearing protector in accordance with the present invention.

The invention will now be described, by way of example only, with reference to the accompanying drawings:

Turning now, in detail, to an analysis of the drawing figures, in FIG. 1, there is shown a cross-sectional view of a bearing protector of the present invention which is fitted to a bore 10 and over a rotating shaft 11 of which the bore 10 and rotating shaft 11 form a single piece of rotating equipment. Generally included within bore 10, but not shown in the accompanying drawings, is a bearing. The bearing protector is comprised of a rotary component 5, a housing component 1, a stator component 3, a stationary sealing face component 4, a rotary sealing O-ring 6, a statically sealing O-ring 9, a resiliently mounted sealing O-ring 2 and one or more magnetic elements 7. The rotary component 5 has a protrusion 16 extending from a cylindrical surface of the rotary component 5.

Figure 2:
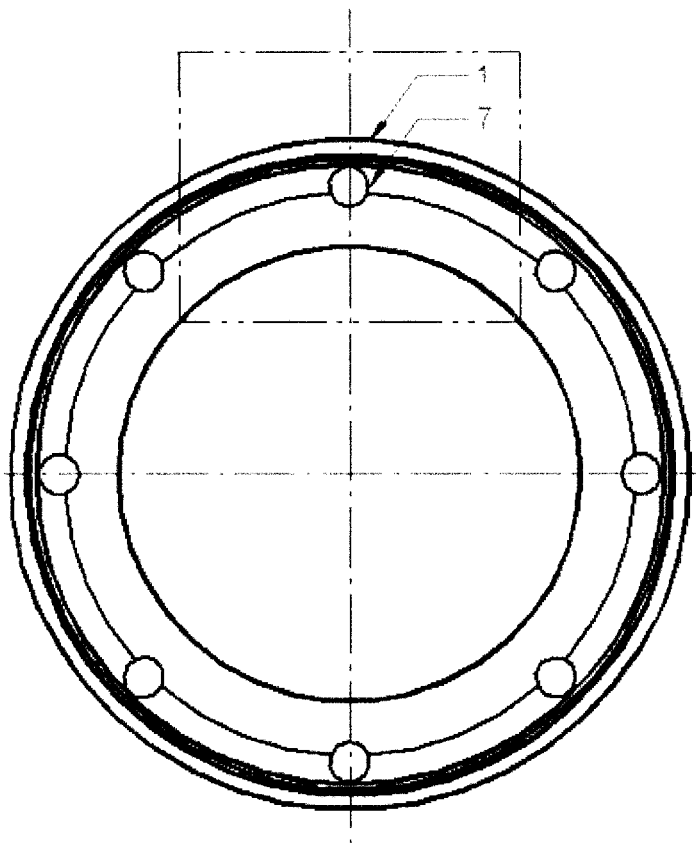
FIG. 2 is a preferred embodiment of the magnetic elements positioning in accordance with the present invention.

Referring, now, to FIG. 2 of the accompanying drawings, there is shown a preferred embodiment of the annularly mounted magnetic elements 7 positioned within the housing component 1.

Figure 3:
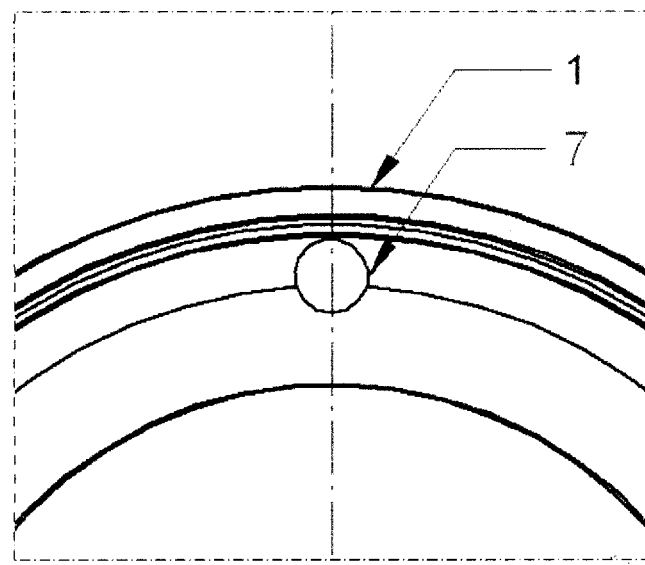
FIG. 3 is an enlarged view of part of the apparatus of FIG. 2.

Referring to FIG. 3 of the accompanying drawings, there is shown an enlarged view of a preferred embodiment of the magnetic elements 7 positioned annularly within the housing component 1, by way of semi-formed holes, whereby the diameter of magnetic elements 7 are overhung allowing assembly of the rotary component 5 into the housing component 1 prior to instillation of magnetic elements 7.

Figure 4:
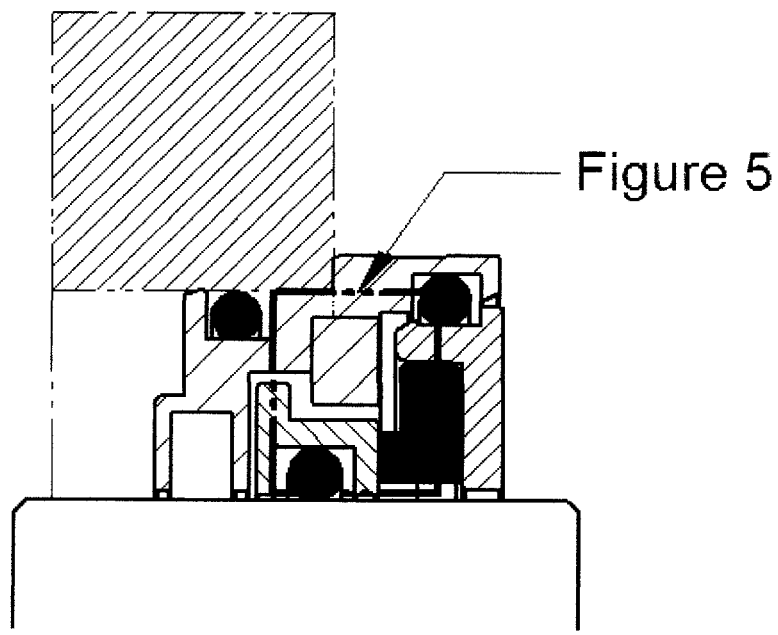
FIG. 4 is cross-sectional view of the first preferred embodiment of a bearing protector in accordance with the present invention; and, FIG. 5 is an enlarged view of part of the apparatus of FIG. 4.

With reference to FIG. 4 of the accompanying drawings, there is shown a cross-sectional view of a preferred embodiment of a bearing protector in accordance with the present invention showing the magnetic element 7 and rotary component 5 interactive mechanisms.

Figure 5:
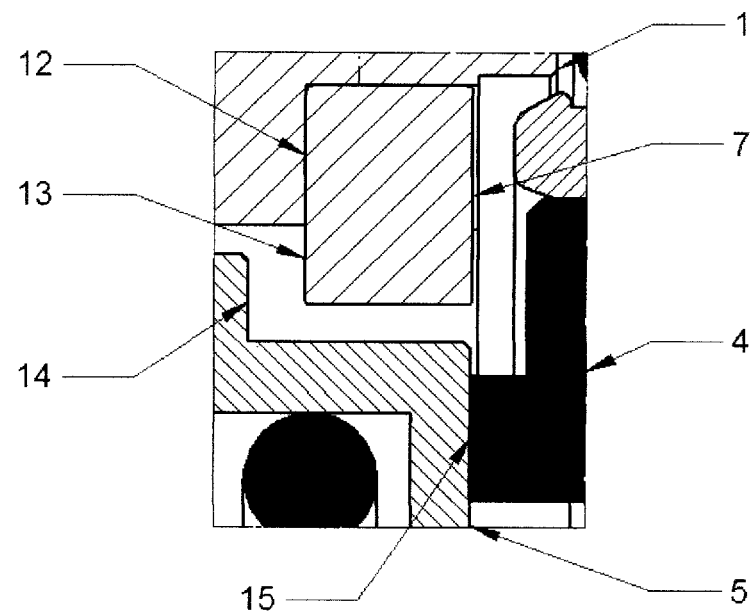

Finally, referring to FIG. 5 of the accompanying drawings, there is shown a cross-sectional view of a preferred embodiment of the magnetic elements 7 interaction with rotary component 5, wherein the magnetic elements 7 are distally located from rotary component 5 via a contact surface 12 maintaining a magnetic force gap between magnetic element 7 face profile 13 and rotary component 5 face profile 14, generating a controlled sealing face contact 15 between rotary component 5 and stationary sealing face component 4.

While only several embodiments of the present invention have been shown and described, it will be obvious to those skilled in the art that many modifications may be made to the present invention without departing from the spirit and scope thereof.

What is claimed is:

1. An apparatus, comprising an annular static component fixed relative to an annular housing having a recess, wherein a stationary sealing face profile is retained, and an annular rotational component for fixing relative to a shaft with the annular static component and the annular rotational component held axially relative to one another, the annular rotational component having a protrusion from a cylindrical surface of the annual rotational component and an annular sealing face profile energized via a plurality of magnetic elements retained within the annular static component for generating a positive sealing face contact between the stationary sealing face profile and a rotational sealing face profile, the cylindrical surface having a first diameter and being perpendicular to the annular sealing face profile and the protrusion having a second diameter being received in the recess, the second diameter being an outer diameter, the plurality of magnetic elements being positioned annually within the housing via semi-formed recesses with a third diameter of the magnetic elements being overhung for allowing assembly of the annular rotational component in the annular housing prior to installation of the plurality of magnetic elements, the third diameter being an inner diameter in cross-section that is below the outside diameter of the protrusion and above the first diameter of the cylindrical surface, said plurality of magnetic elements having a longitudinal axis within the recess.

2. The apparatus according to claim 1, wherein said plurality of magnetic elements is retained within the annular housing of the annular static component via holes allowing said plurality of magnetic elements to interact with the annular rotational component generating positive seal face loading.

3. The apparatus according to claim 2, wherein the holes are partially cylindrical recessed for accommodating cylindrical magnetic elements so that said cylindrical magnetic elements exit radially inwards of the holes for allowing assembly of the annular rotational component within the annular housing prior to installation of the cylindrical magnetic elements.

4. The apparatus according to claim 1, wherein a profile of the annular rotational component profile provides for magnetic element interaction to be promoted and a magnetic force gap is set for maintaining a predetermined seal face loading.

5. The apparatus according to claim 1, wherein the annular stationary sealing face profile is retained via an annular sealing member.

6. The apparatus according to claim 1, wherein said apparatus is a bearing protector.

\* \* \* \* \*